May 9, 1950 A. B. LAKEY 2,507,021
THRUST BEARING
Filed Aug. 20, 1945
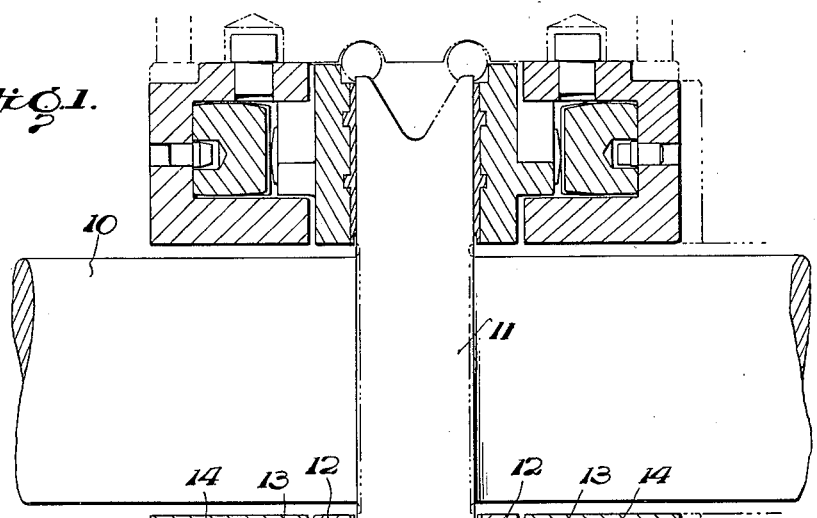
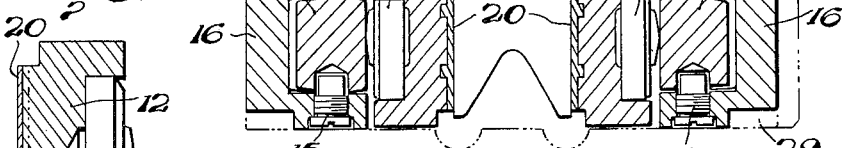
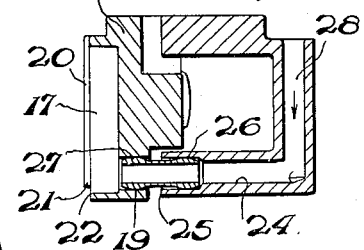
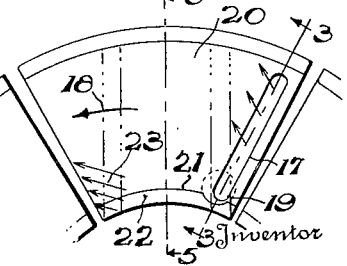
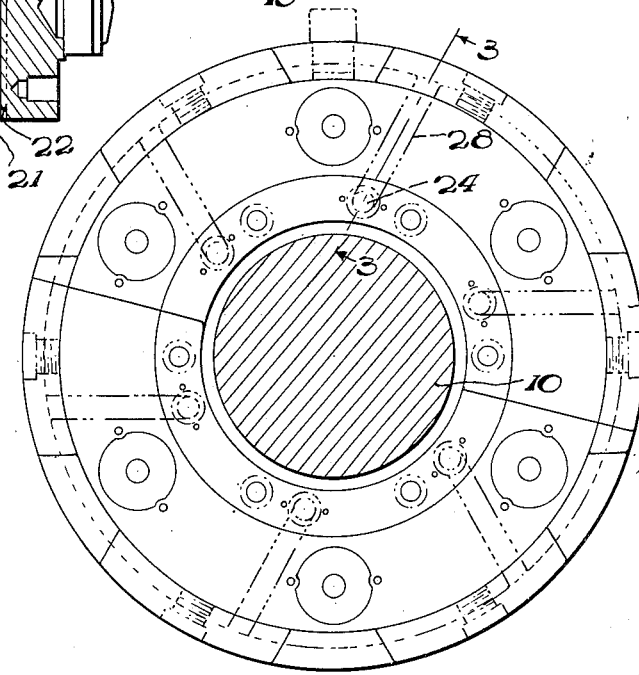
Inventor
Arthur B. Lakey
By Cameron, Kerkam & Sutton
Attorneys Patented May 9, 1950

2,507,021

UNITED STATES PATENT OFFICE 2,507,021

THRUST BEARING

Arthur B. Lakey, Philadelphia, Pa., assignor to Kingsbury Machine Works, Inc., Philadelphia, Pa., a corporation of Delaware Application August 20, 1945, Serial No. 611,495

7 Claims. (Cl. 308—160)

This invention relates to thrust bearings, and more particularly to thrust bearings for shafts rotating at a relatively high speed.

As the R. P. M. of a shaft are increased, increasing difficulties are encountered in securing adequate lubrication of the relatively rotatable bearing surfaces because centrifugal force, which increases with the square of the speed, urges the lubricating oil toward the radially outer periphery of the rotating bearing member. Hence although the lubricating oil may be copiously supplied to the leading edge of each of the stationary thrust shoes, the lubricant tends to flow under the action of centrifugal force diagonally with respect to circumferential lines with the result that the oil films established between the relatively rotatable bearing surfaces become impoverished at the radially inner trailing corner portion of the shoe, with consequent increase in friction and power losses.

It is an object of this invention to provide a thrust bearing for shafts rotating at relatively high speed which largely if not entirely overcomes the foregoing difficulty by assuring adequate lubrication throughout the bearing surface of each shoe.

Another object of this invention is to provide a thrust bearing for shafts rotating at relatively high speed in which the shoe is so constructed that not only is there a copious supply of lubricant provided throughout the width of the shoe at the leading edge of its bearing surface but additional quantities of lubricant are supplied throughout the length of the inner periphery of the shoe so as to replenish such lubricant as is moved diagonally outwardly by the action of centrifugal force.

Another object of this invention is to provide a thrust bearing for shafts rotating at relatively high speed in which each shoe is supplied with lubricating oil under pressure throughout the radial width of its bearing surface at the leading edge and additional quantities of oil under pressure are supplied to the bearing surface throughout the length of its inner periphery so that even the inner trailing corner portion of the bearing surface is adequately flooded with oil at all times.

Another object of this invention is to provide a thrust bearing of the type referred to which provides for the aforesaid improved lubrication of the bearing surfaces without introducing undue complexity of construction and without interfering with the desired flexibility of movement of the bearing shoes.

Other objects will appear as the description of the invention proceeds.

The invention is capable of receiving a variety of mechanical expressions one of which is shown on the accompanying drawings, but it is to be expressly understood that the drawings are for purposes of illustration only and are not to be construed as a definition of the limits of the invention, reference being had to the appended claims for that purpose.

In the accompanying drawings the invention is illustrated as embodied in a double acting thrust bearing for a horizontal shaft, but it is to be expressly understood that the invention is equally applicable to single acting as well as double acting thrust bearings and to thrust bearings for vertical or inclined shafts as well as for horizontal shafts. In said drawings, wherein the same reference characters are employed to designate corresponding parts in the several figures, Fig. 1 is a somewhat schematic elevation of a thrust bearing embodying the present invention;

Fig. 2 is a plan view of a base ring with the shoes and pressure equalizing members removed;

Fig. 3 is a section of the base ring on the line 3—3 of Fig. 2 with the shoe shown as in section on the line 3—3 of Fig. 4;

Fig. 4 is a plan view of the shoe to an enlarged scale; and

Fig. 5 is a section of the shoe on the line 5—5 of Fig. 4.

Referring in detail to the drawings, Fig. 1 illustrates schematically a double acting thrust bearing for a horizontal shaft 10 provided with a thrust collar 11 of any suitable construction. Cooperating with the opposed faces of said collar are any suitable number of thrust shoes 12 which may be of any suitable construction but are illustrated as of a well known type of Kingsbury thrust bearing shoes provided with spherically faced inserts 13 and mounted on an overlapping series of equalizing blocks or plates 14 retained, as by set screws 15, in the channels of channel-shaped base rings 16, as shown for example in Kingsbury Patent No. 1,428,643, granted September 12, 1922. It is to be expressly understood, however, that any other suitable form of bearing shoe and mounting means therefor may be employed in embodying the present invention.

In order to provide copious quantities of lubricating oil throughout the radial width of the bearing surface of each shoe at the leading edge thereof, the bearing face of the shoe at its leading edge is provided with a groove or channel 17 which extends substantially throughout the radial width of the shoe, as shown in section in Fig. 3 and in plan in Fig. 4 wherein the collar is assumed to be rotating in the direction of the arrow 18 thereon. Oil is supplied to groove 17 through a passage 19 extending axially through the shoe from the rear face thereof. The bearing surface 20 of the shoe, which may be of any suitable bearing metal, is stepped down or terminated short of the peripherally inner edge of the shoe as shown at 21 in Figs. 3 and 5, so as to provide a channel 22 which, as shown in Fig. 4, extends throughout the circumferential length at the inner periphery of the bearing surface. The passage 19, as also shown in Fig. 4, not only communicates with the groove 17 but it is of such size and so located that it overlaps the channel 22 so that some of the oil passing axially through the passage 19 flows along the channel 22 from which it can pass to the inner peripheral edge of the bearing surface 20 throughout the length of its inner periphery so that even the inner trailing corner portion of said bearing surface is copiously supplied with lubricating oil from the channel 22 as indicated by the arrows 23 in Fig. 4.

Lubricating oil under pressure may be supplied to the axially extending passage 19 in any suitable way. As shown, the inner axially extending wall of the channel-shaped base ring 16 is provided with an axially extending passage 24 at such a position that it will be aligned with the passage 19 of each shoe. In order to connect the passage 24 with the passage 19 without interfering with the capacity of the shoe to tilt freely in all directions in conformity with the principles of Kingsbury bearings, passages 19 and 24 are connected by a connector 25 having spherical end portions 26 and 27 where they are received in said passages so that a relatively oil-tight connection is maintained but the connector may move universally in all directions with respect to the base ring and the shoe. Thereby the shoe has full freedom to tilt in all directions on its spherically faced supporting surface.

Each passage 24 has communicating therewith a passage 28 extending through the bottom wall of the channel-shaped base ring to an annular channel 29 (see Fig. 1) formed between the outer periphery of the base ring and the inner wall of its confining housing. Oil under pressure is supplied to the channel 29 from any suitable source, as by a separate oil pump or a viscosity oil pump of any suitable construction associated with the thrust collar 11, or any other suitable source of oil under pressure.

In operation, the lubricating oil flows under pressure from the channel 29 through each set of passages 28 and 24 and the connector 25 associated with each shoe into the axially extending passage 19 therein. From each passage 19 the oil fills the channel or groove 17 and also flows along the channel 22, both of which are in communication with the passage 19. Thus the bearing surface 20 is provided throughout its radial extent at its leading edge and also throughout its circumferential extent at its inner edge with a copious supply of lubricating oil, whereby the wedge-shaped lubricating film is established at the bearing face of the shoe and such film is maintained without impoverishment by the action of centrifugal force throughout the bearing surface of the shoe by oil entering the bearing film as needed from said channel 22.

It is customary to operate ordinary Kingsbury thrust shoes so that they are completely immersed in an oil bath whereby there is no substantial excess of the oil supply pressure at the entrance of the film as compared with the pressure at the exit therefrom. By virtue of the basic action of the Kingsbury tilting shoe, however, the tapered films do not need any such excess of pressure to enable them to get their full supply of oil. Hence by reason of the mechanism of these films it will be seen that it is not essential to maintain positive pressure in the oil groove 17, but merely necessary to avoid a negative pressure therein. However, it is sometimes desirable to supply not only the quantity of oil required by the film, but a certain excess flow which, while not traversing the film, will yet be applied to the shoes and collar so as to be effective for the purpose of cooling them. This extra cooling is especially desirable when the collar is heated not only by the bearing friction, but also by conduction of heat along the shaft from other parts of the installation of which the bearing is a part. The general lowering of the bearing temperature thus effected will act to lower the temperature of the oil in the films and thereby result in greater film thickness and improved load capacity. The desired total oil flow and its apportionment between groove 17 and the channel 22 is readily controllable, preferably both by adjusting the oil pressure as supplied to the supply channel 29 and by suitable choice of the parallel depth of the channel 22 as well as of the cross sectional area and form of the opening whereby channel 22 receives oil from passage 19 or groove 17 although either could be used by itself.

It will therefore be perceived that by the present invention the impoverishment of the oil film that has heretofore occurred with increase in the speed of rotation of shafts has been overcome by channeling oil under pressure along the entire inner periphery of the bearing surface of each shoe as well as radially across its leading edge, and consequently power losses due to inadequate lubrication at relatively high speed have been overcome. At the same time the improved lubrication of the thrust shoes is effected without interfering with the desired freedom of operation of the bearing shoes themselves and without introducing undue complexity into the bearing structure.

While the embodiment of the invention illustrated on the drawings has been described with considerable particularity, it is to be expressly understood that the invention is not restricted thereto as the invention is capable of receiving a variety of expressions, some of which will now be apparent to those skilled in the art, and changes may be made in the details of construction, arrangement, proportion and location of parts without departing from the spirit of this invention.

What is claimed is:

1. In a thrust bearing for a shaft rotating at a relatively high speed, relatively rotatable thrust bearing members including a bearing shoe having a thrust bearing surface which is defined by edges that are leading and trailing with regard to the direction of relative rotation of the bearing members and by inner and outer edges that are spaced radially with respect to the axis of rotation where there are different speeds of relative rotation between said bearing members, means for supplying oil under pressure substantially throughout the peripheral extent of the inner edge of said bearing surface including means at the bearing face of said shoe providing a channel in said shoe for lubricating oil extending along said edge, and means in said shoe providing a passage in communication with said channel for supplying said channel with oil under pressure.

2. In a thrust bearing for a shaft rotating at a relatively high speed, relatively rotatable thrust bearing members including a bearing shoe having a thrust bearing surface which is defined by edges that are leading and trailing with regard to the direction of relative rotation of the bearing members and by inner and outer edges that are spaced radially with respect to the axis of rotation where there are different speeds of relative rotation between said bearing members, means for supplying oil under pressure substantially throughout the peripheral extent of the inner edge of said bearing surface including means at the bearing face of said shoe providing a channel in said shoe for lubricating oil extending along said edge and a passage extending through said shoe and communicating with said channel for supplying said channel with oil under pressure.

3. In a thrust bearing for a shaft rotating at a relatively high speed, relatively rotatable thrust bearing members including a bearing shoe having a thrust bearing surface which is defined by edges that are leading and trailing with regard to the direction of relative rotation of the bearing members and by inner and outer edges that are spaced radially with respect to the axis of rotation where there are different speeds of relative rotation between said bearing members, means for supplying oil under pressure substantially throughout the peripheral extent of the inner edge of said bearing surface including means at the bearing face of said shoe providing a channel in said shoe for lubricating oil extending along said edge and the leading edge of said bearing surface having a channel for lubricating oil extending along said edge, and means in said shoe in communication with said channels for supplying said channels with oil under pressure.

4. In a thrust bearing for a shaft rotating at a relatively high speed, relatively rotatable thrust bearing members including a bearing shoe having a thrust bearing surface which is defined by edges that are leading and trailing with regard to the direction of relative rotation of the bearing members and by inner and outer edges that are spaced radially with respect to the axis of rotation where there are different speeds of relative rotation between said bearing members, means for supplying oil under pressure substantially throughout the peripheral extent of the inner edge of said bearing surface including means at the bearing face of said shoe providing a channel in said shoe for lubricating oil substantially coextensive with said edge and the leading edge of said bearing surface having a groove for distributing oil to said bearing surface substantially coextensive with said edge, and means in said shoe providing a passage in communication with said channel and groove for supplying said channel and groove with oil under pressure.

5. In a thrust bearing for a shaft rotating at a relatively high speed, relatively rotatable thrust bearing members including a bearing shoe having a thrust bearing surface which is defined by edges that are leading and trailing with regard to the direction of relative rotation of the bearing members and by inner and outer edges that are spaced radially with respect to the axis of rotation where there are different speeds of relative rotation between said bearing members, means for supplying oil under pressure substantially throughout the peripheral extent of the inner edge of said bearing surface including means at the bearing face of said shoe providing a channel in said shoe for lubricating oil extending along substantially the entire length of said edge, said shoe also having a passage therein in communication with said channel, and supporting means for said shoe provided therein with a passage in communication with the said first named passage for supplying oil under pressure to said channel.

6. In a thrust bearing for a shaft rotating at a relatively high speed, relatively rotatable thrust bearing members including a bearing shoe having a thrust bearing surface which is defined by edges that are leading and trailing with regard to the direction of relative rotation of the bearing members and by inner and outer edges that are spaced radially with respect to the axis of rotation where there are different speeds of relative rotation between said bearing members, means for supplying oil under pressure substantially throughout the peripheral extent of the inner edge of said bearing surface including means at the bearing face of said shoe providing a channel in said shoe extending along said edge and the leading edge of said bearing surface having means extending along said edge for supplying lubricating oil to said surface, a passage in said shoe in communication with said last named means and said channel, and a support for said shoe having a passage therein in communication with said first named passage for supplying oil under pressure to said channel and means.

7. In a thrust bearing for a shaft rotating at a relatively high speed, relatively rotatable thrust bearing members including a bearing shoe having a thrust bearing surface which is defined by edges that are leading and trailing with regard to the direction of relative rotation of the bearing members and by inner and outer edges that are spaced radially with respect to the axis of rotation where there are different speeds of relative rotation between said bearing members, the inner edge of said bearing surface at which exists the lower speed of relative rotation having a channel substantially coextensive with said edge, said shoe also having a passage in communication with said channel, supporting means for said shoe on which said shoe is tiltably mounted and having a passage in communication with the passage in said shoe for supplying oil under pressure thereto, and a connector having a passage connecting the passages in said support and shoe and flexibly connecting said shoe and said support.

ARTHUR B. LAKEY.

REFERENCES CITED

The following references are of record in the file of this patent:

UNITED STATES PATENTS

| Number | Name | Date |
| --- | --- | --- |
| 1,117,504 | Kingsbury | Nov. 17, 1914 |
| 1,293,471 | Kingsbury | Feb. 4, 1919 |
| 1,900,924 | Firth | Mar. 14, 1933 |
| 2,168,345 | Kingsbury | Aug. 8, 1939 |
| 2,363,260 | Peskin | Nov. 21, 1944 |

FOREIGN PATENTS

| Number | Country | Date |
| --- | --- | --- |
| 263,378 | Great Britain | Dec. 30, 1926 |